Feb. 28, 1956   J. A. LESTIN   2,736,120
DECOY
Filed Dec. 26, 1951
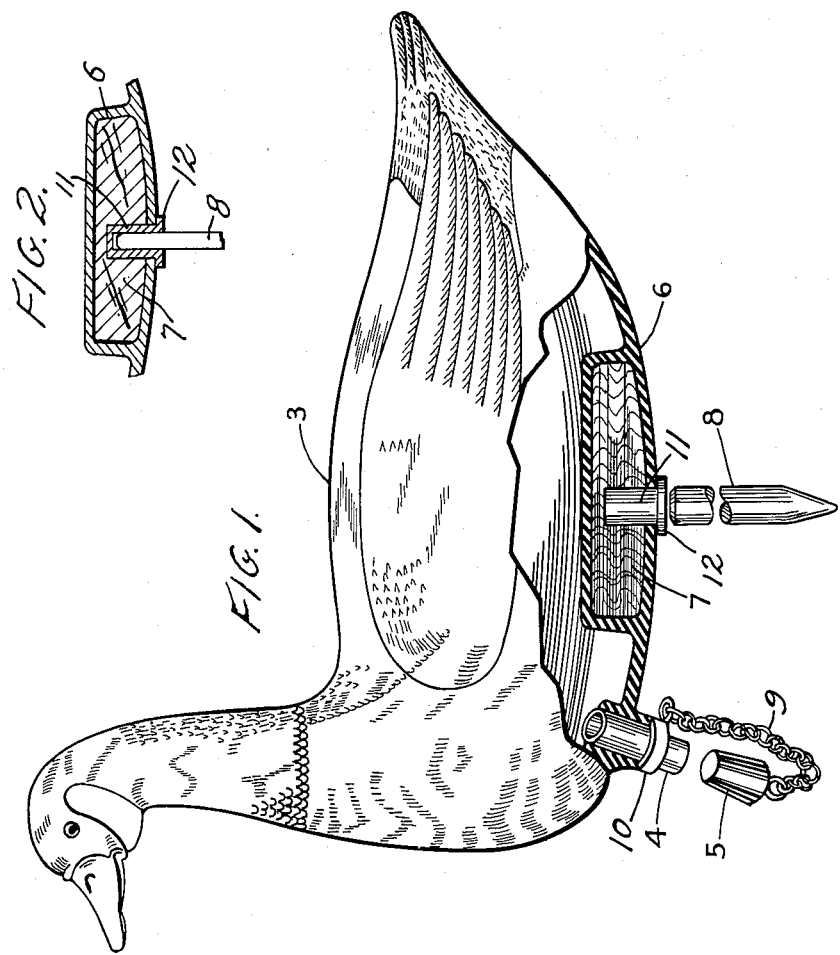
INVENTOR
John A. Lestin
Ralph Burch
Attorney

United States Patent Office 2,736,120
Patented Feb. 28, 1956

---

2,736,120

DECOY

John Albert Lestin, Prince George,
British Columbia, Canada

Application December 26, 1951, Serial No. 263,233

1 Claim. (Cl. 43—3)

My invention relates to a novel device to be used as a decoy for wild flowl, such as geese, ducks and the like, and to be used on water or on the land. It can also be used as a decoy for game birds.

The object of the invention is to provide an inflatable device to be used as a decoy, which is light and deflatable making it convenient to carry when not in use.

With these and other objects in view that may appear while the description proceeds the invention consists in the novel arrangement of cooperating parts shown in the accompanying drawing forming part of this application and in which:

Fig. 1 is a side elevation of a decoy goose, and

Fig. 2 is a detail sectional view of the socket member.

Referring more in detail to the drawing in which similar reference characters designate corresponding parts throughout the several views it will be seen that the invention consists of a decoy goose 3 made of flexible material such as rubber, moulded to the desired shape, and which is inflated by introducing air through the tube 4 formed of metal or other suitable material located in an aperture formed in the bottom of the goose or at any other position thereon. The tube 4 is sealed by a stopper element 5 after inflation which may be formed of cork or other suitable material. The element 5 is attached by a chain 9 to a flange 10 surrounding the tube 4. An air tight compartment 6 is formed in the body of the goose and a block of wood 7 or other suitable material is disposed inside said compartment. The block 7 is recessed to receive a socket member 11 having an annular flange 12 at its external end and fitted within the socket member is a stake element 8 which may be formed of wood or other suitable material. Element 8 tends to keep the goose upright when in the water and can be used as a stake for land use.

While the preferred embodiment of the invention has been disclosed it is understood that minor changes in the details of construction, combination and arrangement of co-operating parts may be resorted to within the scope of what is claimed without departing from the spirit of the invention.

I claim:

A decoy fowl or bird comprising an inflatable body of desired shape having an air inlet passage in its bottom wall and an opening for reception of a socket member, an air tight compartment formed within said body centrally of the bottom wall and including a portion of the bottom wall as a part thereof, a wood block fitted within said compartment having a central vertical recess in alignment with the opening in the body, a socket member fitted in the recess of said block having an annular flange at its external end engaging the edge of the opening, and a stake having its upper end fitted in said socket and depending from the bottom of said body.

References Cited in the file of this patent

UNITED STATES PATENTS

| | | |
|---|---|---|
| 156,239 | Strater et al. | Oct. 27, 1874 |
| 836,823 | Oliver et al. | Nov. 27, 1906 |
| 1,469,188 | Moore | Sept. 25, 1923 |
| 1,608,045 | Stallman | Nov. 23, 1926 |
| 2,256,778 | Lundgren | Sept. 23, 1941 |
| 2,339,983 | Day | Jan. 25, 1944 |
| 2,494,631 | Risch | Jan. 17, 1950 |